March 11, 1952    A. S. KROTZ ET AL    2,588,638
SEAT HAVING TORSION SPRING SUSPENSION
Filed Aug. 10, 1946      2 SHEETS—SHEET 1
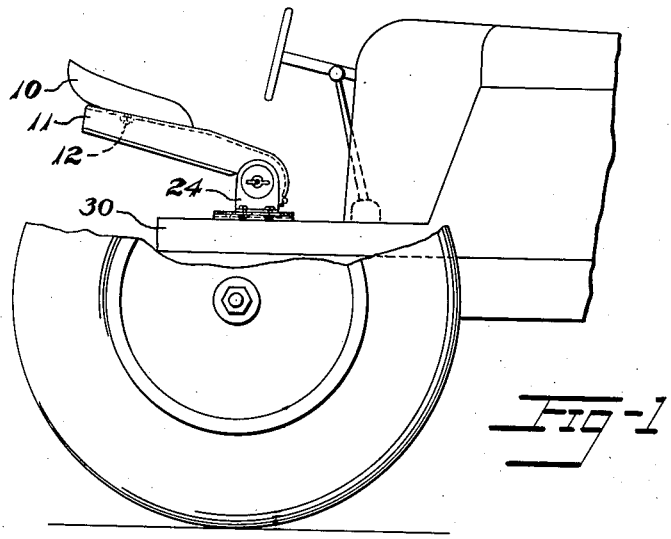
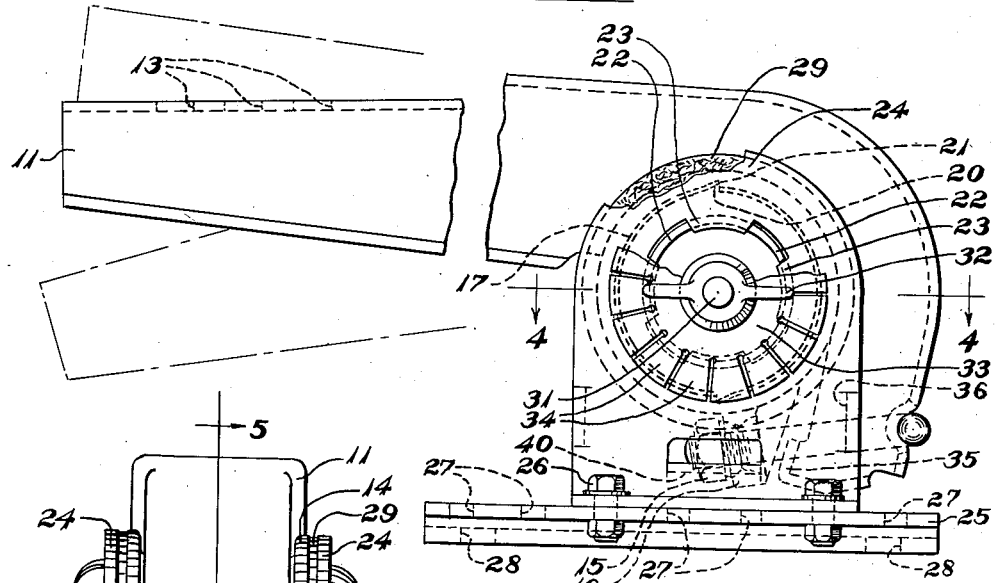
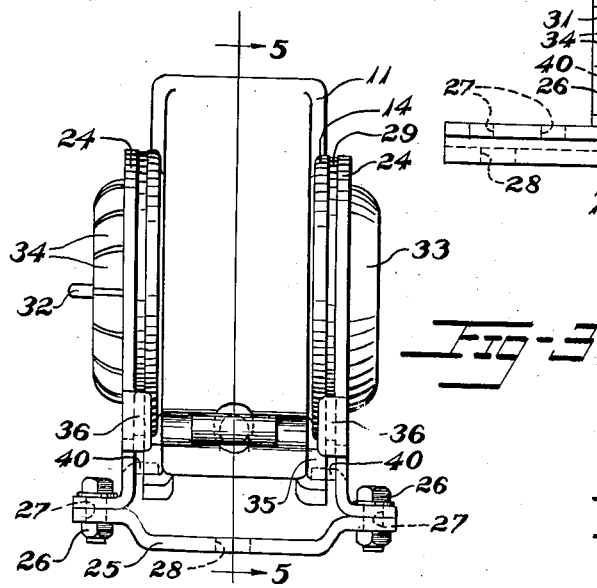
INVENTORS
Alvin S. Krotz
Robert R. Cowden
By
Atty.

March 11, 1952 A. S. KROTZ ET AL 2,588,638
SEAT HAVING TORSION SPRING SUSPENSION
Filed Aug. 10, 1946 2 SHEETS—SHEET 2
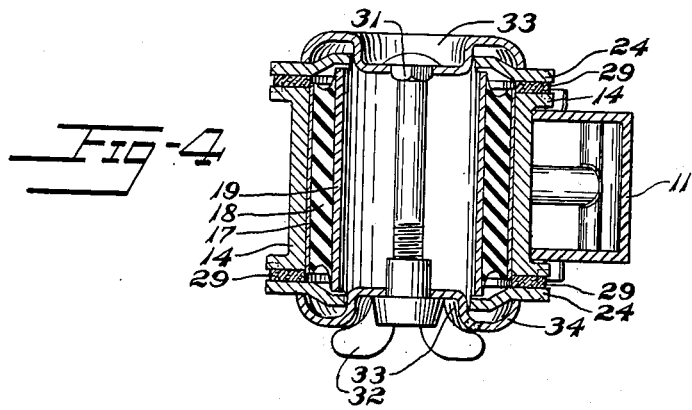
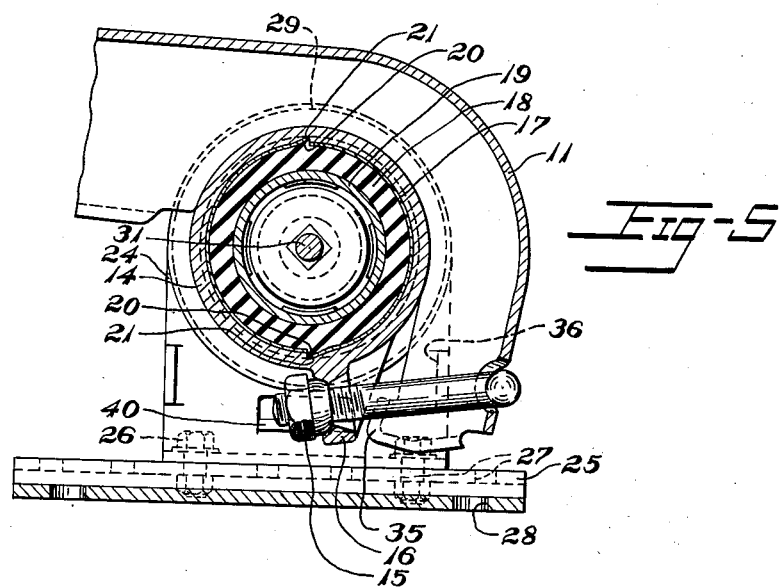
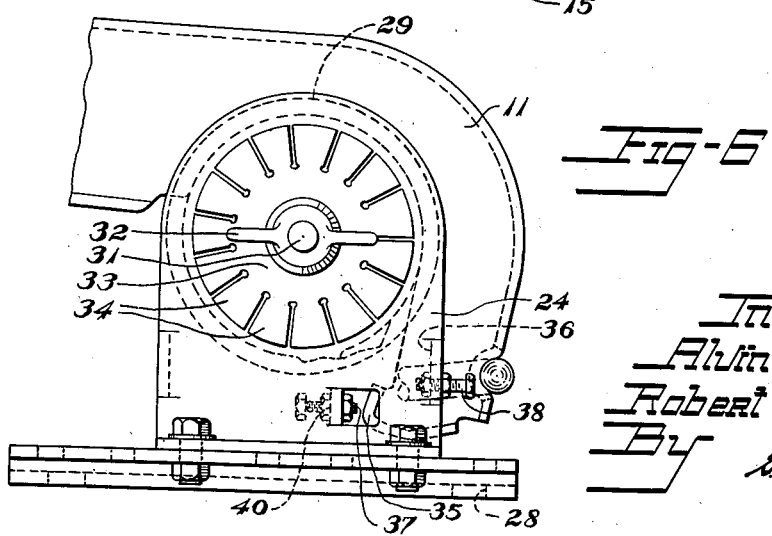
Inventors
Alvin S. Krotz
Robert R. Cowden

UNITED STATES PATENT OFFICE 2,588,638

SEAT HAVING TORSION SPRING SUSPENSION

Alvin S. Krotz, Akron, and Robert R. Cowden, Cuyahoga Falls, Ohio, assignors to The B. F. Goodrich Company, New York, N. Y., a corporation of New York Application August 10, 1946, Serial No. 689,706

13 Claims. (Cl. 155—51)

This invention relates to seat suspensions of the type used for tractors and other vehicles and for installations where it is desirable to isolate the seat from the vibrations and jolts of the supporting structure. Cushioning of tractor seats is especially desirable because of the usual lack of inadequacy of cushioning between the ground and tractor body and because of the rough terrain on which tractors frequently operate. Improved cushioning of such vehicle seats reduces rider fatigue and thereby contributes to the alertness, efficiency, comfort, safety and health of the riders.

Objects of the invention are to provide an improved seat suspension, to provide adjustable means whereby the suspension may be damped, to provide for quiet operation of the suspension, to provide adjustment means for adapting the suspension to different weight riders, to provide elimination of the necessity for lubrication, to provide limiting means for the range of swing of the cushioned supported member, to provide simplicity of construction, ease of installation and adjustment and to provide for a minimum of maintenance.

These and further objects will be apparent from the following description, reference being had to the accompanying drawings in which:

Fig. 1 is an elevation of a tractor incorporating a seat suspension constructed in accordance with and embodying the invention, parts being broken away.

Fig. 2 is an elevation of the seat suspension, parts being broken away.

Fig. 3 is an end view of the suspension shown in Fig. 2.

Fig. 4 is a section taken along line 4—4 of Fig. 2.

Fig. 5 is a section taken along line 5—5 of Fig. 3.

Fig. 6 is an elevation of a modified construction.

Referring to the drawings, apparatus constructed in accordance with and embodying the invention is shown in which a seat 10 is adjustably mounted on a supporting member such as a cantilever arm 11 by bolts 12 secured in holes 13, 13 in the arm 11. The arm 11 is shaped to fit over a flanged cylinder 14 and adjustably secured to the cylinder 14 by a T-bolt and adjusting nut 15 passing through a lug 16 mounted on the cylinder 14 and through an aperture in the arm 11.

A sleeve member 17 having peripheral projections 20 is inserted in the cylinder 14 and the projections 20 mesh with grooves or recesses 21 in the inner surface of the cylinder 14 in a manner such that the cylinder 14 is locked against counter-clockwise rotational slippage with respect to the sleeve 17 as viewed in Fig. 2. A shaft member 19 is placed within the sleeve 17 and a body of resilient rubber-like material 18 is interposed between and bonded to the shaft 19 and sleeve 17. The body of rubber-like material 18 may be bonded to the shaft 19 and sleeve 17 by various means and preferably by vulcanization. The shaft 19 has projecting tongues 22 extending longitudinally from each end. The tongues 22 mesh with radially extending lugs 23 in supporting structures such as brackets 24 which are mounted adjustably on a mounting plate 25 by bolts 26 secured in apertures 27. The mounting plate 25 may be secured to the tractor frame 30 by bolts secured in apertures 28.

Friction disks 29 are mounted between the brackets 24 and the flanged cylinder 14 abutting the flanges of the cylinder 14 and the walls of the brackets 24. The brackets 24 are adjustably held against the friction disks by a tie bolt 31 and a wing nut 32. Spring washers 33 having peripheral slots formed by radially extending segments 34 are disposed intermediate the bolt 31 and the brackets 24 to maintain a constant pressure on the friction disks 29.

The arm 11 may have limiting flanges 35 disposed so that they abut stop elements such as projections 36 and 40 from the brackets 24 and limit the stroke of the arm 11.

In operation the suspension position of the arm 11 in the free unloaded or up position is as shown by the upper dotted lines in Fig. 2. At this position the resilient, rubber-like body 18 is subjected to an initial torsional stress by virtue of the engagement of flange 35 with projection 40, which prevents the body material from returning to an unstressed condition. The arm 11 is prevented from sliding off the cylinder 14 by the engagement of flange 35 on the extended portion of the arm with the projection 40. A force tending to raise the arm 11 will urge the flange 35 against the projection 40 and the arm will tend to pivot around the projection 40. The path of the arm about the projection being on a greater radius than that of the cylinder 14 intersects with the cylinder and therefore movement of the arm will be restricted and disengagement from the cylinder will be prevented.

The addition of weight to the seat 10 as by a person or a rider sitting on the seat will turn the arm 11 in a counter-clockwise direction about the shaft 19 to the ride or static load position shown in full lines in Fig. 2. At this position the body of resilient rubber-like material will be stressed more in circular shear and especially when it is torsionally deflected by vibrations and jolts of the tractor.

The springing motion of the arm 11 is damped by the action of the brackets 24 and cylinder 14 sliding on the friction disks 29 and retarding relative motion of the cylinder 14 with respect to the brackets 24. The amount of dampening may be regulated by tightening the wing nut 32 on the tie-bolt 31 to move the brackets 24 together and increase the pressure upon the friction disks 29 and thereby increase dampening, or by loosening the wing nut 32 to decrease the pressure upon the friction disks 29 and thereby decrease dampening. The spring washer 33 tends to maintain the set pressure upon the friction disks by compensating for wear of the disks 29.

If, when the load is applied to the seat, the arm 11 swings to a different position than that desired it may be adjusted by turning the adjusting nut 15 on the T-bolt. Tightening the nut 15 will move the arm 11 as seen in Fig. 2, clockwise about the shaft 19 and raise the seat while loosening the nut 15 will move the arm 11 counter-clockwise about the shaft 19 and lower the seat. This adjustment might be necessary to regulate the suspension for light or heavy riders, that is to raise the seat setting for a heavy rider and lower the seat setting for a light rider. In cases where larger adjustments are necessary than may be made by turning the adjusting nut 15 the shaft tongues 22 may be removed from the bracket lugs 23 and the shaft 19 turned and the tongues 22 reset against other bracket lugs 23.

When jolts of the tractor are abnormally large such as might cause the arm 11 to drop and unseat the rider the arm 11 motion is limited by the engagement of the projections 36 with the flanges 35. The lowermost position of the arm 11 with relation to the brackets 24 at the safety stop or bump position is shown in Fig. 2 in dotted lines.

In Fig. 6 a modification of the invention is shown in which the limiting projections 36, 40 are adjustable. Stop-bolts 37, 38 adjustably mounted in the projections make possible the changing limits of the arm stroke. If it is desired to lower the unloaded position of the seat 10 the stop nut 37 adjustably mounted in the projection 40 and engaging the flange 35 at the unloaded position may be moved toward the flange 35 or if it is desired to raise the safety stop position of the seat 10 the stop nut 38 adjustably mounted in the projection 36 and engaging the flange 35 at the safety stop position may be moved toward the flange 35.

The seat 10 may be adjusted fore and aft to provide for variation in ride qualities and to compensate for change of weight of riders. Moving the seat rearward increases the leverage of the arm and under the same load the seat 10 will descend. Conversely moving the seat 10 forward will decrease the leverage of the arm 11 and under the same load the seat will rise. The motion of the seat will also be different at different distances from the spring element as the amplitude and the period of oscillation will be increased as the seat is moved rearward.

Adjustments are also present to move the suspension assembly fore and aft on the tractor by means of bolts 25 and holes 26 so that the seat 10 may be placed in the desired relationship to the controls of the tractor.

Variations may be made without departing from the invention as it is defined in the following claims.

We claim:

1. A seat suspension comprising a supporting structure, a torsion spring mounted on said structure, a cantilever member mounted on said spring for springing movement therewith, means for adjustably limiting the swing of said member, means for adjustably applying an initial torsional stress to said spring, means comprising an element between said structure and said member for adjustably dampening the springing movement of said member, and a seat mounted on said member at a position spaced along said member from said spring.

2. A seat suspension comprising a supporting structure, a torsion spring mounted on said structure, a cantilever member mounted on said spring for springing movement therewith, said spring comprising inner and outer sleeve members, a body of resilient rubber-like material bonded to said members to cushion relative rotation of said inner and outer members by torsional stress on said material, means interposed between said inner and outer members for adjustably dampening the relative movement of said inner and outer members, and a seat mounted on said cantilever member at a position spaced along said member from said spring.

3. A seat suspension comprising a mounting structure, spaced brackets adjustably mounted on said structure, a cantilever member, a torsion spring comprising inner and outer sleeve members, one of said members being mounted slidably in an axial direction and fixedly in a circumferential direction in said brackets, said cantilever member being mounted on the other of said members, a body of resilient, rubber-like material interposed between and bonded said inner and outer members for cushioning said cantilever member by torsional shear of said spring, a body of slippage-resisting material interposed between one of said brackets and said cantilever member for dampening the springing movement of said cantilever member, and a seat mounted on said cantilever member at a position spaced along said member from said spring.

4. A seat suspension comprising a supporting structure, a pair of spaced brackets mounted on said structure, an arm, a torsion spring comprising inner and outer sleeve members, a body of resilient, rubber-like material bonded between said members to cushion relative rotation of said inner and outer members by circumferential shear of said body, one of said members mounted slidably in an axial direction and fixedly in a circumferential direction between said brackets, said arm being mounted on the other of said members, means connecting said brackets for urging said brackets toward said spring members, and a seat mounted on said arm.

5. A seat suspension comprising a supporting structure, a pair of spaced brackets mounted on said structure, an arm, a torsion spring comprising inner and outer sleeve members, a body of resilient, rubber-like material bonded between said members to cushion relative rotation of said inner and outer members by circumferential shear of said body, said arm being mounted on one of said members, the other of said members being intercalated between said brackets to permit movement of said member in an axial direction and prevent movement of said member in a circumferential direction, a tie bolt connecting said brackets for urging said brackets toward said spring members, a spring washer interposed between one of said brackets and said tie bolt, and a seat mounted on said arm.

6. A seat suspension comprising a supporting structure, a pair of spaced brackets mounted on said structure, an arm, a torsion spring comprising inner and outer sleeve members, a body of resilient, rubber-like material bonded between said members to cushion relative rotation of said inner and outer members by circumferential shear of said body, said arm being mounted on one of said members, the other of said members being intercalated between said brackets to permit movement of said member in an axial direction and prevent movement of said member in a circumferential direction, a body of slippage-resisting material interposed between one of said brackets and one of said sleeve members for dampening springing of said arm, means connecting said brackets for urging said brackets toward one of said sleeve members, a spring washer interposed between one of said brackets and said means, and a seat mounted on said arm.

7. A seat suspension comprising a supporting structure, a cylindrical torsion spring mounted on said structure, a member having a cylindrical recess rotatably mounted on said spring, a portion of said member extending away from said spring, means for preventing disengagement of said member from said spring comprising a stop element on the supporting structure disposed so as to engage said portion of said member in a manner such that the force to disengage will tend to rotate said member about said element as an axis, and the resultant path of rotation of the farther edge of the recess of said member will intersect with the circumference of said spring.

8. A seat suspension comprising a supporting structure, a cylindrical torsion spring mounted on said structure, a cylindrical body mounted on said spring, a member having a cylindrical recess rotatably mounted on said body, a portion of said member extending away from said cylindrical body, means for preventing disengagement of said member from said body comprising a stop element on said supporting structure disposed so as to engage said portion of said member in such a manner that the force to disengage will tend to rotate said member about said element as an axis, and the resultant path of the farther edge of the recess of said member will intersect with the circumference of said cylindrical body.

9. A seat suspension comprising a supporting structure, a supported member, cushioning means between said supported member and said supporting structure comprising a resilient element of rubber or other rubber-like material bonded to said supported structure and to said supporting member, dampening means comprising slippage resisting elements adjustably mounted between said supporting structure and supported member, and spring amplitude limiting means comprising adjustable stops mounted on said supporting structure engageable with said supported member at a plurality of positions of said supported member.

10. A seat suspension comprising supported and supporting structures, one of said structures having spaced bracket members, a torsion spring mounted between said bracket members, the other of said structures being mounted on said torsion spring for springing movement therewith, means comprising slippage resisting elements interposed between said bracket members and said spring and adjustable means for urging said bracket members against said slippage resisting elements for adjustably dampening the springing movement of said supported structure and a seat so mounted on said supported structure that the entire seat is located at a position spaced along said structure from said spring.

11. A seat suspension comprising a supporting structure, a torsion spring mounted on said structure, a cantilever member mounted on said spring for springing movement therewith, said structure having bracket members and embracing said spring, means comprising slippage resisting elements interposed between said bracket members and said spring and adjustable means for urging said bracket members against said slippage resisting element for adjustably dampening the springing movement of said member and a seat so mounted on said member that the entire seat is located at a position spaced along said member from said spring.

12. A damped spring assembly comprising supported and supporting structures, a torsion spring disposed between said structures comprising inner and outer cylindrical members and an intervening cylindrical body of resilient rubber material, one of said members being mounted on the supporting structure and the other of said members being mounted on the supported structure for cushioning relative movement of said structures by torsionally stressing said body of resilient rubber under relative rotative movement of said spring members, an element mounted at an end of said spring for axial movement with respect to and non-rotatively with respect to said one of said members and disposed with a portion of said element overlying an end portion of the other of said members and in relative rotative relation to the latter member, friction material interposed between the portions for frictional action under relative rotation of said members to dampen the springing action of said body of resilient rubber material during relative movement of said structures, and means for applying pressure to said portions and said friction material to maintain the frictional engagement.

13. A damped spring assembly comprising supported and supporting structures, one of said structures having spaced-apart bracket members, a torsion spring mounted between said bracket members comprising inner and outer tubular members and an intervening tubular body of resilient rubber material, one of said tubular members being mounted non-rotatively on said bracket members and for axial movement relative to said bracket members, the other of said tubular members being connected to the other of said structures for cushioning relative movement of said structures by torsionally stressing said body of resilient rubber under relative rotative movement of said tubular members, said bracket members having positions overlying the ends of said other of said tubular members, friction material interposed between the adjacent portions of said bracket members and said other of said tubular members for frictional action under relative rotation of said members and means in the inner tubular member extending between said bracket members and connected thereto for urging said bracket members toward one another to maintain the frictional action of said friction material for damping the springing action of said body of resilient rubber during relative movement of said structures.

ALVIN S. KROTZ.
ROBERT R. COWDEN.

REFERENCES CITED

The following references are of record in the file of this patent:

UNITED STATES PATENTS

| Number | Name | Date |
|---|---|---|
| 1,775,517 | Flintermann | Sept. 9, 1930 |
| 1,864,282 | Sperry | June 21, 1932 |
| 2,051,043 | Herold | Apr. 18, 1936 |
| 2,296,224 | Travers | Sept. 15, 1942 |

FOREIGN PATENTS

| Number | Country | Date |
|---|---|---|
| 157,891 | Switzerland | Jan. 2, 1933 |
| 522,100 | Great Britain | June 10, 1940 |